(12) United States Patent
Kawano

(10) Patent No.: US 8,213,765 B2
(45) Date of Patent: Jul. 3, 2012

(54) RECORDING AND PLAYBACK APPARATUS FOR RECORDING AND PLAYING BACK DIGITAL SIGNALS IN ACCORDANCE WITH CAPABILITY OF RECORDING MEDIUM

(75) Inventor: Hideki Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 843 days.

(21) Appl. No.: 12/326,426

(22) Filed: Dec. 2, 2008

(65) Prior Publication Data
US 2009/0245760 A1    Oct. 1, 2009

(30) Foreign Application Priority Data
Mar. 31, 2008 (JP) .................................. 2008-089122

(51) Int. Cl.
*H04N 9/80* (2006.01)

(52) U.S. Cl. .......................... 386/239; 386/241; 386/326
(58) Field of Classification Search .................. 386/239, 386/241, 326
See application file for complete search history.

(56) References Cited

FOREIGN PATENT DOCUMENTS
JP         8-17137 A       1/1996
JP       2005210425 A  *   8/2005
* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP

(57) ABSTRACT

A recording and playback apparatus of the present invention comprises a part for measuring a speed for recording data into a recording medium, a part for detecting a bit rate of data inputted to this apparatus, a part for changing the bit rate of the data, a part for setting a bit rate to the part for changing the bit rate and a part for detecting the recording medium and recording and reading out data into/from the recording medium.

12 Claims, 9 Drawing Sheets

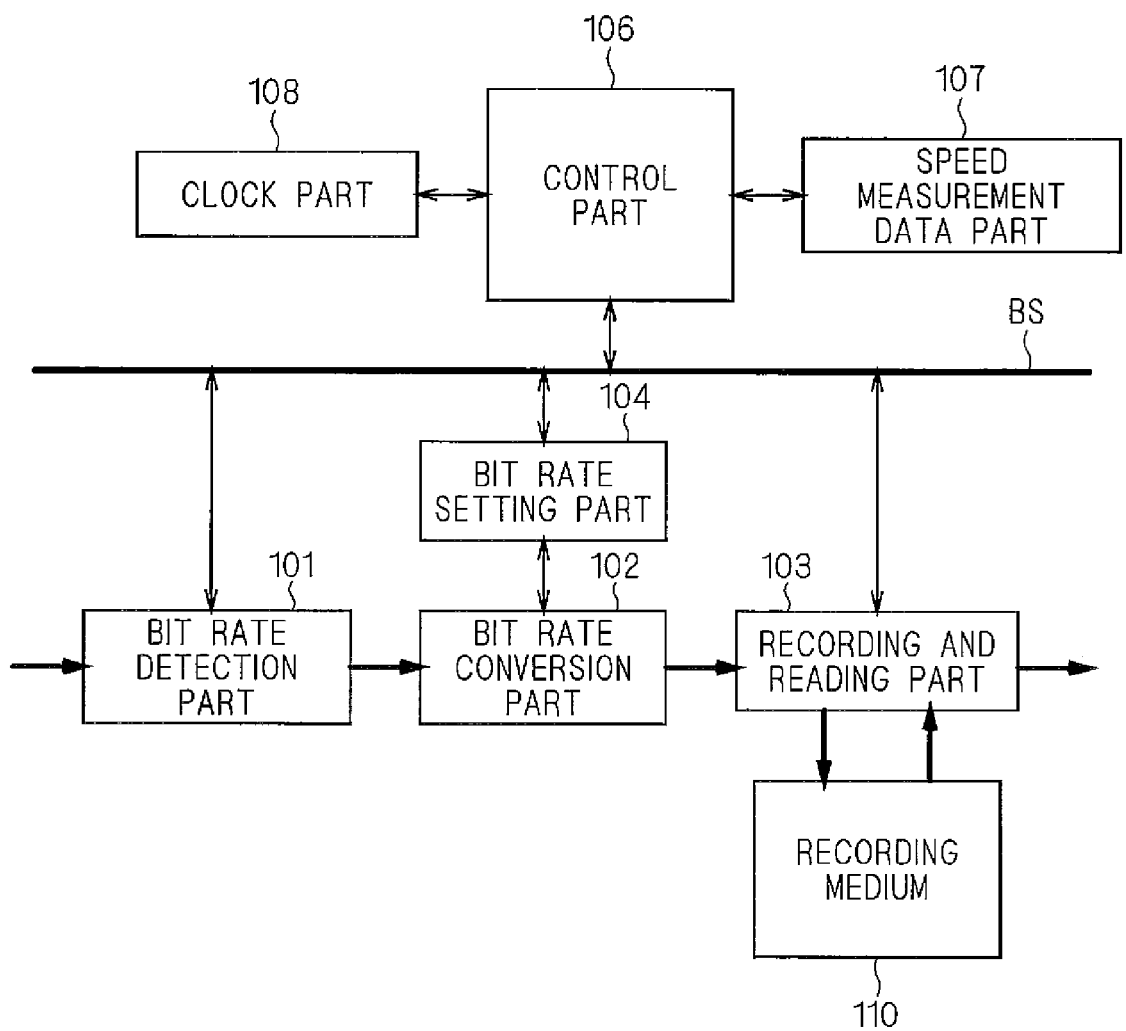
F I G . 1

RECORDING AND PLAYBACK APPARATUS FOR RECORDING AND PLAYING BACK DIGITAL SIGNALS IN ACCORDANCE WITH CAPABILITY OF RECORDING MEDIUM

BACKGROUND OF THE INVENTION

1. Field of the Invention

The present invention relates to an apparatus for recording and playing back data into/from a recording medium, and more particularly to a recording and playback apparatus having a function for recording and playing back digital signals of digital terrestrial broadcasting or digital satellite broadcasting, digital video cameras and the like in accordance with the capability of a recording medium.

2. Description of the Background Art

At present, the digital terrestrial broadcasting and the digital satellite broadcasting using a broadcasting satellite (BS) and a communication satellite (CS) are performed. As apparatus for recording digital signals of these digital broadcastings, recording apparatus for recording a tuned transport stream into a hard disk are put into commercial production. In such apparatus, in order to record digital signals of a digital broadcasting program, it is necessary to compare the free space of a recording medium with the amount of data of the program to be recorded and check if there is enough free space in the recording medium.

For improvement, proposed is a technique to record data (signals) with its bit rate being changed by changing the compression ratio of information from the storage capacity of the recording medium and the recording time (e.g., see Japanese Patent Application Laid Open Gazette No. 8-17137 (pp. 2 to 3)).

In the background-art technique, when it is intended to record a plurality of programs at the same time in an apparatus capable of recording and playing back broadcasting programs, for example, if there is enough storage capacity to record a plurality of programs in a recording medium and data is recorded into the recording medium as it is, a bit rate during the recording becomes larger. As a result, the bit rate for recording disadvantageously becomes higher than a speed at which data can be recorded in the recording medium. Further, since the speed at which data can be recorded varies depending on the recording medium to be used, if a recording bit rate is fixed, sometimes data can be recorded and other time can not.

SUMMARY OF THE INVENTION

The present invention is intended to solve this problem, and it is an object of the present invention to achieve a recording and playback apparatus capable of recording data into a recording medium and playing back the data, regardless of the bit rate of data to be inputted, even if the recording speed and the reading speed vary depending on the kind or specifications of recording media such as hard disks, flash memories or the like.

The present invention is intended for a recording and playback apparatus. According to the present invention, the recording and playback apparatus includes a recording and reading part, a bit rate detection part, a bit rate setting part, a bit rate conversion part and a control part. The recording and reading part detects a recording medium and records and reads out data into/from the recording medium. The bit rate detection part detects a bit rate of data inputted from the outside. The bit rate conversion part converts the bit rate of the inputted data into a bit rate set by the bit rate setting part and outputs input data after bit rate conversion to the recording and reading part. The control part transmits the bit rate of the input data sent from the bit rate detection part to the bit rate setting part as an input bit rate and sends data for recording speed measurement to the recording and reading part in response to detection of the recording medium by the recording and reading part to control the recording and reading part to start recording the data for recording speed measurement into the recording medium, which measures a recordable bit rate that is a speed for recording into the recording medium on the basis of the amount of data for recording speed measurement which is sent to the recording and reading part and a recording time required to record the data for recording speed measurement into the recording medium and outputs the recordable bit rate to the bit rate setting part when it detects, by an end signal from the recording and reading part, that recording of the data for recording speed measurement into the recording medium is completed. The bit rate setting part performs a comparison between the input bit rate and at least the recordable bit rate, and (a) if the comparison object which is compared with the input bit rate is larger than the input bit rate, the bit rate setting part sets the bit rate conversion part so that a bit rate after conversion of the input data becomes not larger than the input bit rate, and (b) if the comparison object which is compared with the input bit rate is smaller than the input bit rate, the bit rate setting part sets the bit rate conversion part so that a bit rate after conversion of the input data becomes not larger than the smallest one of comparison objects which are compared with the input bit rate.

By the present invention, it is possible to perform recording and playback in accordance with the recording speed characteristics of the recording medium.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a constitution of a recording and playback apparatus in accordance with a first preferred embodiment of the present invention;

DESCRIPTION OF THE PREFERRED EMBODIMENTS

The First Preferred Embodiment

Figure 2:
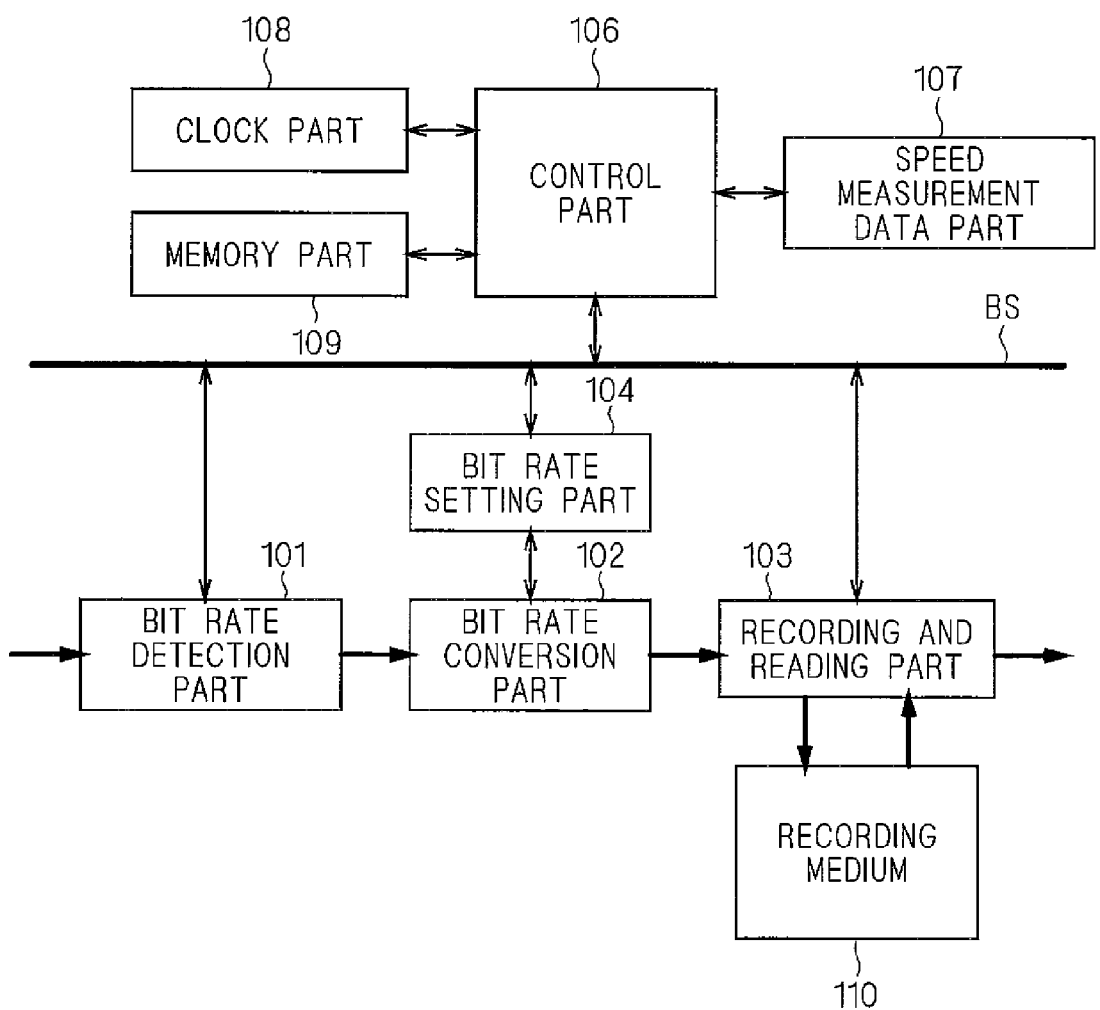
FIG. 2 is a block diagram showing a constitution of a recording and playback apparatus in accordance with a second preferred embodiment of the present invention.

FIG. 1 is a block diagram showing a constitution of a recording and playback apparatus in accordance with the first preferred embodiment of the present invention. In FIG. 1, a bit rate detection part 101 has a function to detect a bit rate of data inputted from the outside. A bit rate conversion part 102 has a function to change the bit rate of the inputted data. A bit rate setting part 104 has a function to select a bit rate after change and set the selected bit rate to the bit rate conversion part 102. A recording and reading part 103 has functions to record a second data which is the input data whose bit rate has been changed by the bit rate conversion part 102 into a recording medium 110 and read and output the second data which is recorded in the recording medium 110 and to detect the recording medium 110. A speed measurement data part 107 is a memory into which data for speed measurement is stored. A clock part 108 has a function to generate and control a present time and has a timer function. A control part 106 has functions to control the above constituent parts 101, 104, 103, 107 and 108 through a bus BS and to give an instruction for starting measurement of a recording speed, which consists of e.g., a CPU and a DSP. Further, the recording medium 110 is e.g., a hard disk, a USB memory or a memory card.

Hereinafter, discussion will be made on a method of measuring a recording speed in recording data into a recording medium 110. First, when the recording and reading part 103 detects the recording medium 110 (for example, it detects that a USB memory is inserted into a USB terminal), the control part 106 starts measurement of the recording speed of the detected recording medium 110. The control part 106 resets a timer of the clock part 108. Then, the control part 106 reads out data for speed measurement which is stored in the speed measurement data part 107. After that, the control part 106 gives an instruction to the recording and reading part 103 so as to record the read-out data for speed measurement into the recording medium 110. Then, the control part 106 outputs the data for speed measurement to the recording and reading part 103 and controls simultaneously the timer of the clock part 108 to operate. Further, the control part 106 may use all or part of the data stored in the speed measurement data part 107 as the data for speed measurement to be recorded into the recording medium 110. After that, when the control part 106 receives a signal indicating the end of recording which is outputted from the recording and reading part 103 to the control part 106 and detects that recording of the data for speed measurement into the recording medium 110 has been finished, the control part 106 stops the operation of the timer of the clock part 108. At that time, the time that the timer of the clock part 108 indicates is a recording time required for the recording and reading part 103 to record the data for speed measurement which is sent from the control part 106 into the recording medium 110.

Then, the control part 106 calculates the recording speed of the recording medium 110 i.e., a "recordable bit rate" on the basis of the following equation (1) from the amount of data for speed measurement which is sent to the recording and reading part 103 and the above recording time measured by the timer of the clock part 108. In this case, the control part 106 grasps the amount of data for speed measurement which is outputted from the control part 106 to the recording and reading part 103. Then, the control part 106 outputs the recordable bit rate calculated on the basis of Eq. (1) to the bit rate setting part 104.

$$\text{recordable bit rate} = \frac{\text{(the amount of sent data for speed measurement)}}{\text{(recording time)}} \quad (1)$$

Next, discussion will be made on an operation of the bit rate setting part 104 for setting a bit rate determined by itself to the bit rate conversion part 102. First, under the control of the control part 106, the bit rate detection part 101 detects the bit rate of the data inputted to the apparatus from the outside. Then, the bit rate detection part 101 sends the information on the detected bit rate to the control part 106 through the bus BS, and the control part 106 outputs the information on the detected bit rate, which is received from the bit rate detection part 101, to the bit rate setting part 104 as an "input bit rate". The bit rate setting part 104 performs a comparison between the above input bit rate and the recordable bit rate calculated on the basis of Eq. (1).

As the result of the comparison, if the recordable bit rate is larger than the input bit rate detected by the bit rate detection part 101, in other words, if the recordable bit rate is faster than the input bit rate, the bit rate setting part 104 sets the bit rate conversion part 102 so that the bit rate conversion part 102 will not change the bit rate. For example, in response to a setting signal of the bit rate setting part 104, the bit rate conversion part 102 rewrites the input data having the input bit rate without any change and outputs the data. Alternatively, in response to the setting signal of the bit rate setting part 104, the bit rate conversion part 102 switches an internal selector and outputs the inputted data without any change. In any case, the bit rate conversion part 102 outputs the inputted data, without changing the bit rate of the inputted data, to the recording and reading part 103 in accordance with the above setting of the bit rate setting part 104. Alternatively, the bit rate setting part 104 may set the bit rate conversion part 102 so that the bit rate after change of the input data will become smaller than the input bit rate.

On the other hand, if the recordable bit rate is smaller than the input bit rate detected by the bit rate detection part 101, in other words, if the recordable bit rate is slower than the input bit rate, the bit rate setting part 104 sets the bit rate conversion part 102 so that the bit rate after change (hereinafter, also referred to as "recording bit rate") will become not larger than the recordable bit rate.

Figure 6:
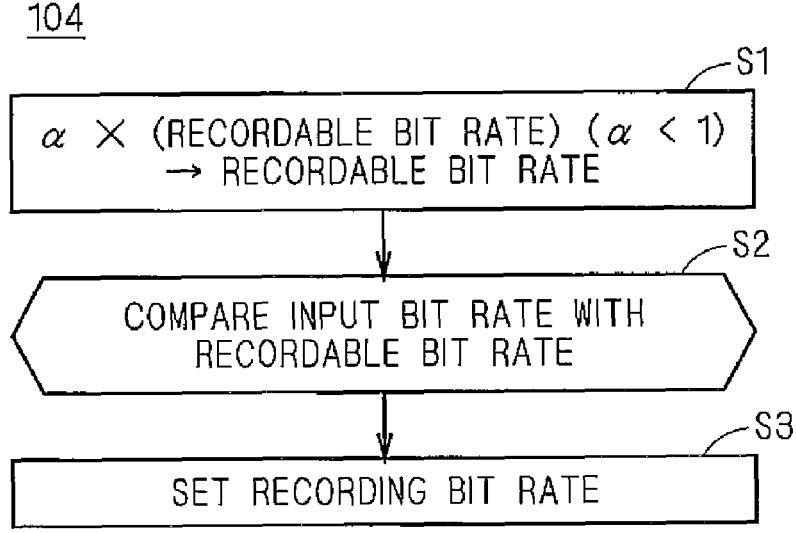
FIGS. 6 to 11 are flowcharts showing operations of a bit rate setting part.
Figure 7:
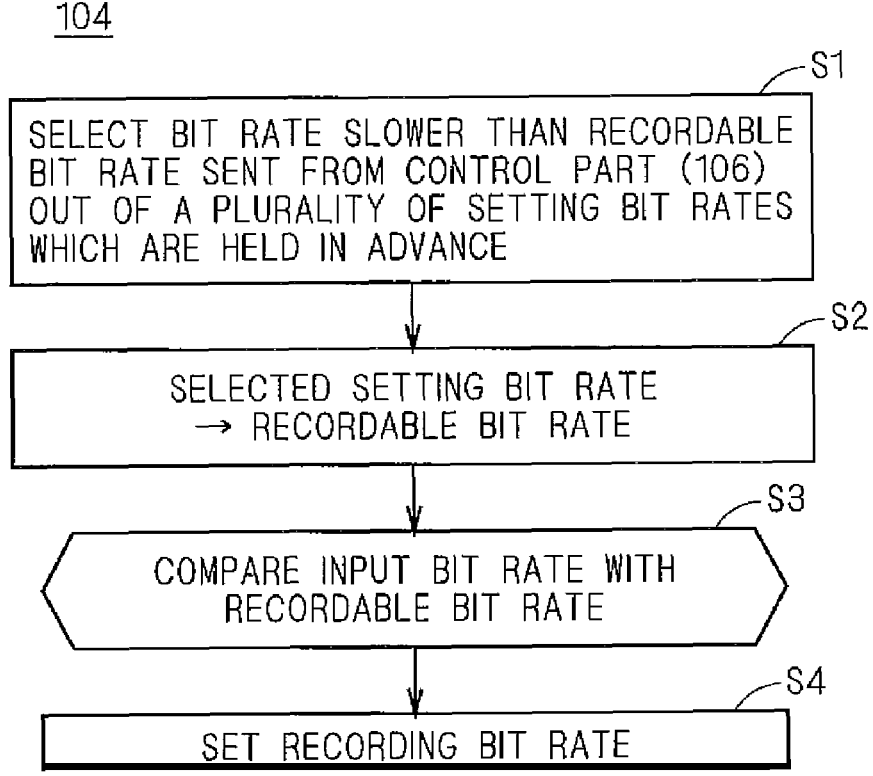
Figure 8:
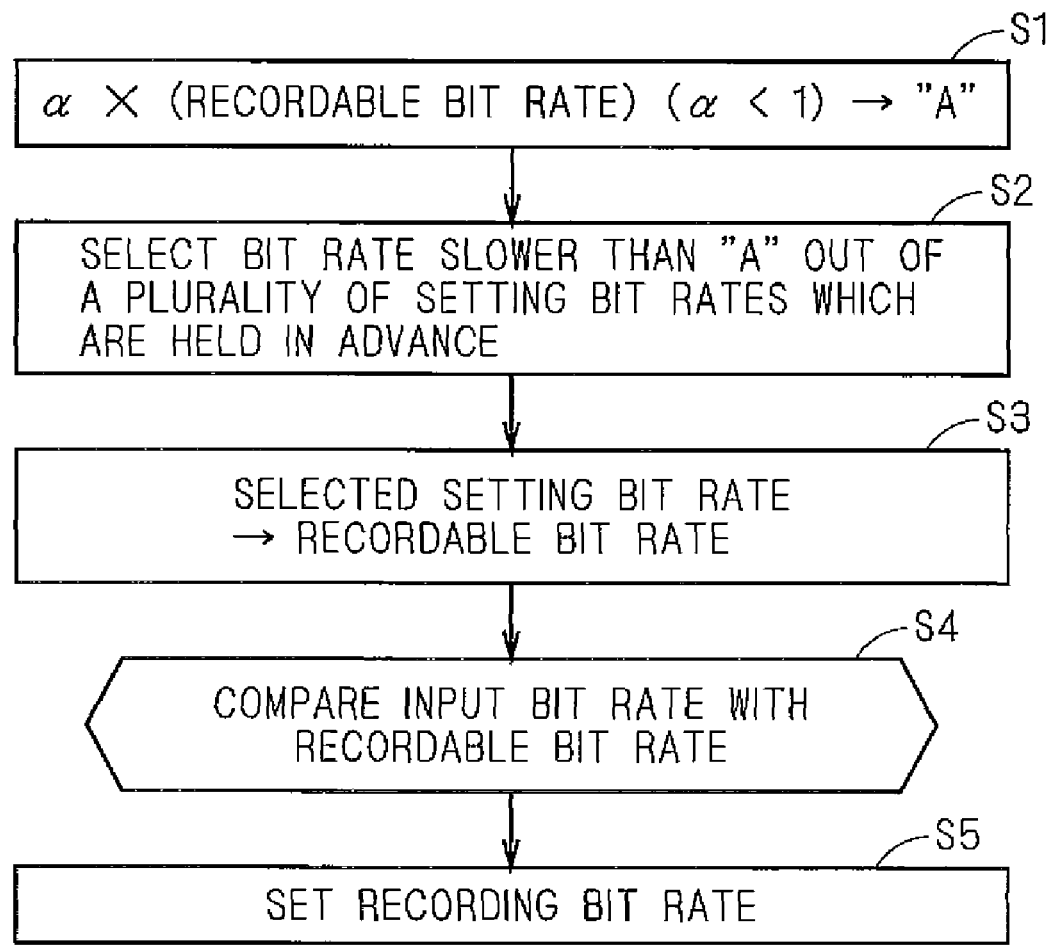

(A) Further, in order to leave a margin in the recording bit rate, a bit rate having a value obtained by multiplying the measurement result (recordable bit rate) obtained by the control part 106 from Eq. (1) by a coefficient less than 1 which is set in advance may be compared with the input bit rate, as a new recordable bit rate which is slower than the measurement result (see FIG. 6). (B) Alternatively, the bit rate setting part 104 may hold in advance a plurality of setting bit rates which are settable to the bit rate conversion part 102, select one of the above setting bit rates, which is slower than the recordable bit rate sent from the control part 106, and set the selected setting bit rate to the recordable bit rate to be compared with the input bit rate, to perform the above comparison (see FIG. 7). (C) Still alternatively, by a combination of (A) and (B), the bit rate setting part 104 may set the recordable bit rate to be compared with the input bit rate, to perform the above comparison (see FIG. 8).

Figure 9:
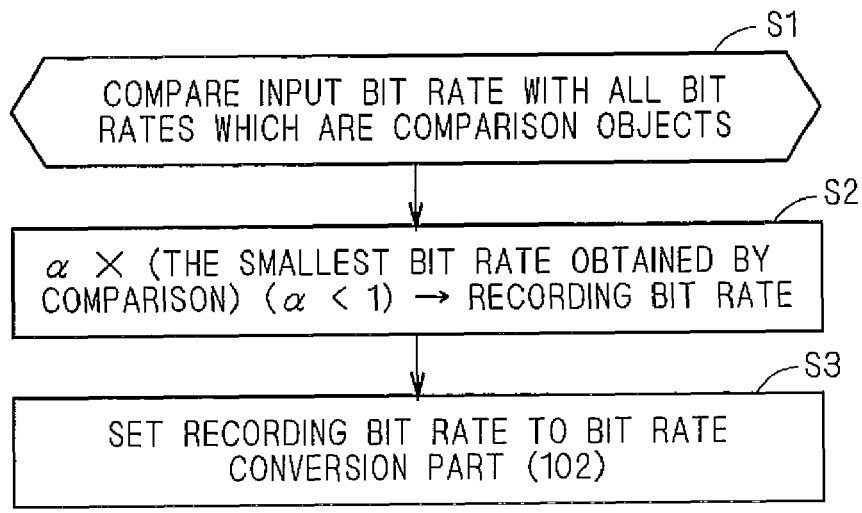

Further, the bit rate setting part 104 may set a bit rate obtained by multiplying the bit rate which is the smaller one of the input bit rate detected by the bit rate detection part 101 and the recordable bit rate which are compared with each other by a constant coefficient (less than 1) to the bit rate conversion part 102 as the recording bit rate (see FIG. 9).

Figure 10:
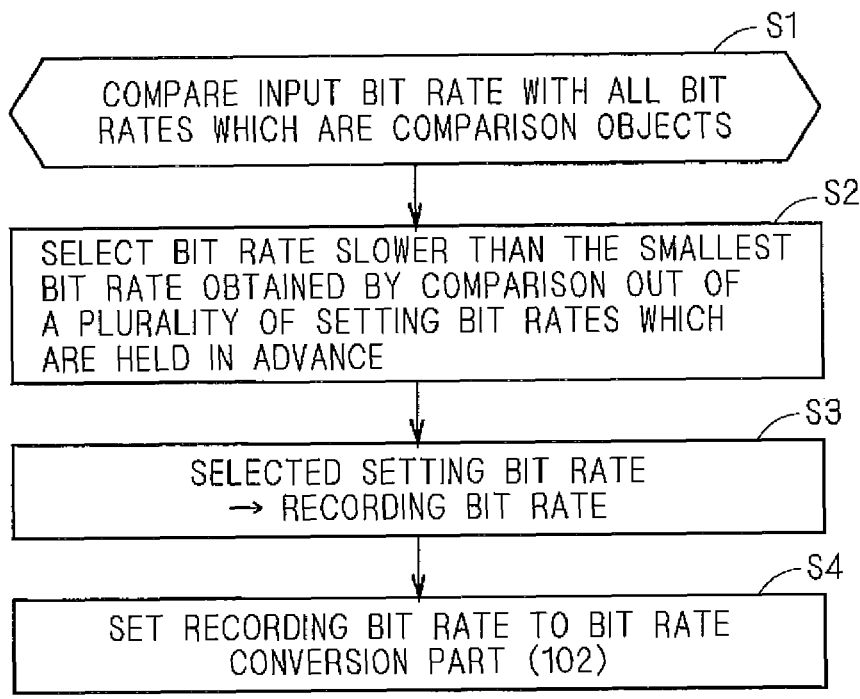

Alternatively, the bit rate setting part 104 may hold in advance a plurality of setting bit rates which are settable to the bit rate conversion part 102, select a bit rate which is smaller than the smaller one of the input bit rate and the recordable bit rate which are compared with each other out of the above setting bit rates and set the selected setting bit rate to the bit rate conversion part 102 (see FIG. 10).

Figure 11:
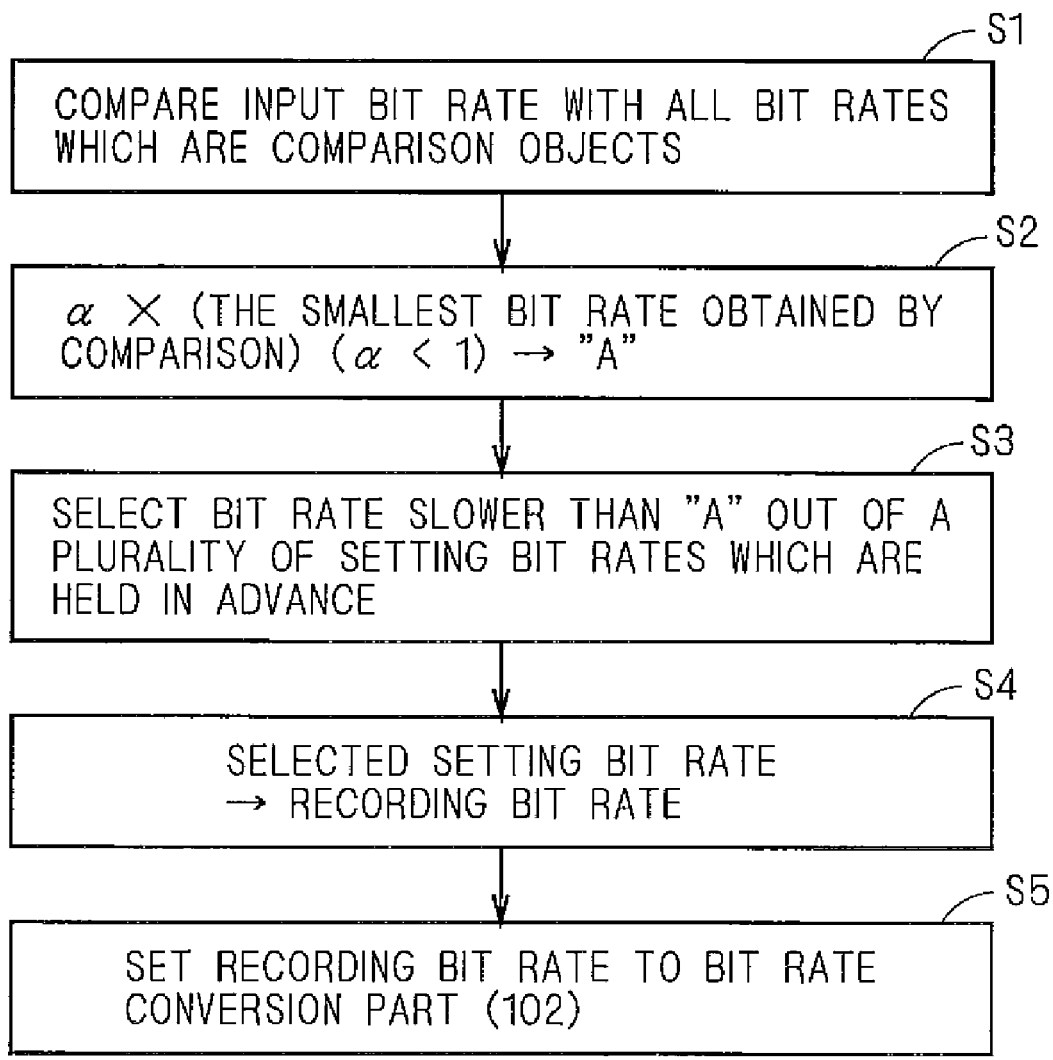

Still alternatively, the bit rate setting part 104 may hold in advance a plurality of setting bit rates which are settable to the bit rate conversion part 102, select a bit rate which is smaller than a bit rate obtained by multiplying the smaller one of the input bit rate and the recordable bit rate which are compared with each other by a constant coefficient less than 1 out of the above setting bit rates and set the selected setting bit rate to the bit rate conversion part 102 (see FIG. 11).

Next, discussion will be made on an operation of converting the bit rate of the inputted data into a bit rate (recording bit rate) to be recorded into the recording medium 110. The bit rate conversion part 102 changes the bit rate of the inputted data to the bit rate set by the bit rate setting part 104. In order for the bit rate conversion part 102 to change the bit rate, there are methods of (1) reducing the amount of data by removal of unnecessary data and data compression to slow the bit rate, (2) slowing the bit rate by trans rate, and (3) increasing the compression ratio with transcode to slow the bit rate. In order to increase the compression ratio, if the data is image data, the number of pixels constituting a screen (frame) is reduced or the frame rate is lowered. Further, if the data is image data and the image data is compressed by e.g., MPEG2, the compression method may be changed to one with high compression ratio by MPEG4, H.264 or the like. Furthermore, by combination of these methods as appropriate, the bit rate conversion part 102 may change the input bit rate to a still slower bit rate.

In the first preferred embodiment, the data for recording speed measurement may be a transport stream. Alternatively, the data for recording speed measurement may be a transport stream scrambled for limitation of view or may be a transport stream encrypted for copyright protection or prevention of data tampering, or may be transport streams of both types.

Further, by reading out data which is recorded in the recording medium 110 in advance and storing the read-out data into the speed measurement data part 107, the control part 106 may use the read-out data as the data for recording speed measurement.

Furthermore, the speed measurement data part 107 may have a function to generate random numbers, and the control part 106 may use the data which is generated randomly as occasion demands by the speed measurement data part 107 using this function, as the data for speed measurement.

As a method of measuring the recording time, instead of the above timer, a clock function of the clock part 108, which indicates the present time, may be used. In this case, the control part 106 outputs the data for speed measurement to the recording and reading part 103 while capturing the present time of the clock part 108. The control part 106 sets the captured time to a "start time". When the control part 106 detects, by the signal from the recording and reading part 103, that recording of the data for speed measurement into the recording medium 110 has been finished, the control part 106 captures the present time from the clock part 108. The control part 106 sets the present time at that point of time to an "end time". Then, the control part 106 calculates a time required to record the data for speed measurement from the difference between the end time and the start time and uses the calculated time as the recording time (as expressed by the following equation (2)).

$$\text{recording time} = (\text{end time}) - (\text{start time}) \tag{2}$$

Then, the control part 106 may substitute the recording time obtained as above into Eq. (1), to calculate the recordable bit rate.

In the recording and playback apparatus of the first preferred embodiment having the above constitution, even for a variety of recording media 110, by actually measuring the speed for recording data into a recording medium to change the input bit rate to the recording bit rate, it is possible to record the data in accordance with the recording speed which depends on the recording medium.

The Second Preferred Embodiment

FIG. 2 is a block diagram showing a constitution of a recording and playback apparatus in accordance with the second preferred embodiment of the present invention. In FIG. 2, the constituent elements identical to those of the first preferred embodiment are represented by the same reference signs.

FIG. 2 is different from FIG. 1 in that a memory part 109 is additionally provided. In other words, in the first preferred embodiment, every time when a USB memory is inserted into a USB terminal, for example, the recording speed of each recording medium 110 is merely measured so that a recording speed of data to be recorded into the USB memory can be obtained. In the second preferred embodiment, however, as its characteristic feature, the memory part 109 stores a look-up table in which only information (specific information) specifying each recording medium 110 and the recordable bit rate measured and calculated by the control part 106 on the recording medium 110 are associated with each other and written. Hereinafter, discussion on the constituent parts which perform the same operations as those in the first preferred embodiment will be omitted.

In the recording and playback apparatus of the second preferred embodiment, when the recording and reading part 103 detects a recording medium 110, the control part 106 gives an instruction to the recording and reading part 103 so as to acquire information specifying the detected recording medium 110. Herein, the "information specifying the recording medium 110" (specific information) refers to only information representing the recording medium 110 and no other information on the recording medium 110 exists. In a case, for example, where the information such as maker name, product name, model number, product number and the like is recorded in the recording medium 110 as electronic information, the information consisting of extracted pieces of electronic information which are appropriate as only information representing the recording medium 110 is the "information specifying the recording medium 110". The control part 106 uses the information specifying the recording medium 110, which is acquired and sent by the recording and reading part 103, to search a set of information (look-up table) in the memory part 109 to see if the same information is recorded in the memory part 109.

At the result of the search, if the control part 106 can not find the same information as the information specifying the recording medium 110 in the look-up table of the memory part 109, the control part 106 measures the recordable bit rate of the recording medium 110 by the same method as shown in the first preferred embodiment. Then, the control part 106 writes and records the recordable bit rate obtained by the measurement, together with the information specifying the recording medium, into the look-up table of the memory part 109.

On the other hand, at the result of the search, if the control part 106 can find the same information as the information specifying the recording medium 110 in the look-up table of the memory part 109, the control part 106 reads the recordable bit rate which is recorded, being associated with the information specifying the recording medium 110, out from the set of information (look-up table) in the memory part 109. Then, the control part 106 sets the recordable bit rate read out from the memory part 109 to the bit rate setting part 104 as the recordable bit rate of the recording medium 110. An operation of the bit rate setting part 104 will be discussed later in the fourth preferred embodiment. The operation after setting the recordable bit rate is the same as that discussed in the first preferred embodiment, except the operation in the bit rate setting part 104.

In the recording and playback apparatus of the second preferred embodiment having the above constitution, by once measuring the recordable bit rate and recording the recordable bit rate into the memory part 109 together with the information specifying the recording medium 110, if the recording and reading part 103 detects the same recording medium 110, it is possible to eliminate the necessity of measuring the recordable bit rate again. Further, since the recordable bit rate of the detected recording medium is immediately found and it is therefore possible to eliminate the time period for measuring the recordable bit rate of the recording medium, the time period until the recording medium can be used is reduced.

The Third Preferred Embodiment

Figure 3:
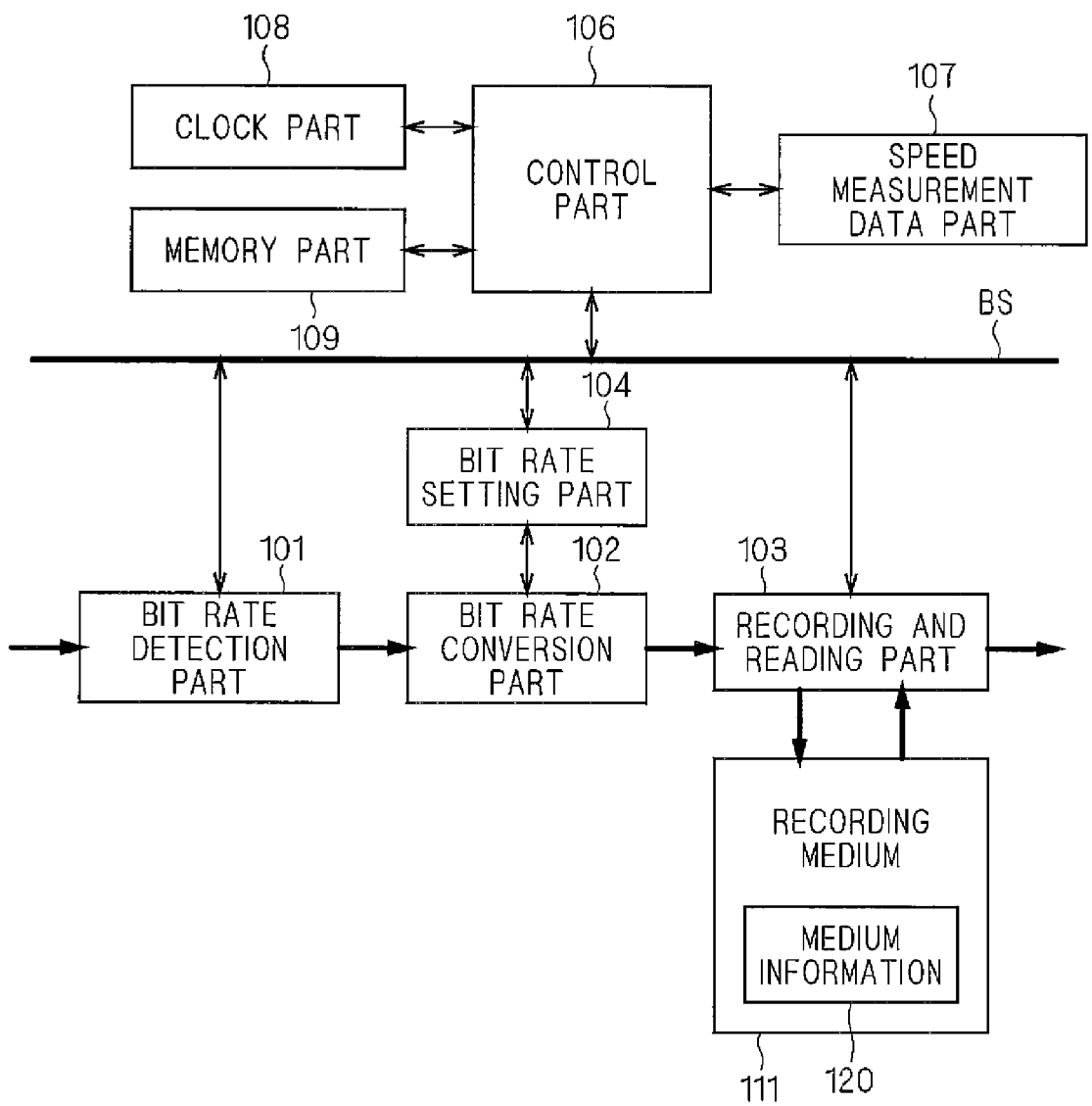
FIG. 3 is a block diagram showing a constitution of a recording and playback apparatus in accordance with a third preferred embodiment of the present invention.

FIG. 3 is a block diagram showing a constitution of a recording and playback apparatus in accordance with the third preferred embodiment of the present invention. In FIG. 3, the constituent elements identical to those of FIG. 2 are represented by the same reference signs.

FIG. 3 is different from FIG. 2 in that medium information 120 which is information necessary for specifying a recording medium is stored in the recording medium 110 and the memory part 109 stores "information necessary for specifying a recording medium (i.e., medium information or information for specifying)", instead of "the information specifying a recording medium" in the second preferred embodiment, together with a recordable bit rate of the corresponding recording medium 110 in the look-up table thereof. In other words, the third preferred embodiment proposes a recording and playback technique to cover the case where a recording medium 111 does not store or hold such electronic "information specifying a recording medium" as discussed in the second preferred embodiment.

In FIG. 3, the recording medium 111 has an area to store the medium information 120. Herein, the median information 120 refers to "information necessary for specifying a recording medium" (information for specifying) as discussed later. Hereinafter, description on the parts for performing the same operations as shown in the second preferred embodiment will be omitted.

In the recording and playback apparatus of the third preferred embodiment, when the recording and reading part 103 detects a recording medium 111, the control part 106 gives an instruction to the recording and reading part 103 so as to acquire "information necessary for specifying the detected recording medium 111" from the area in the recording medium 111 in which the medium information 120 is stored.

As the result that the recording and reading part 103 searches the detected recording medium 111 to thereby obtain the "information necessary for specifying the recording medium" in response to the instruction, if there is no medium information 120 in the recording medium 111 or if the medium information 120 is found but there is no information necessary for specifying the recording medium 111 in the medium information 120, the recording and reading part 103 sends a signal indicating the result back to the control part 106 and the control part 106 consequently generates the "information necessary for specifying the recording medium" on the detected recording medium 111 for itself. In this case, since the "information necessary for specifying the recording medium" generated by the control part 106 has to completely distinguish the recording medium to be specified from other recording media, the information has to be only specific information. Then, the control part 106 can use e.g., a "serial number" which corresponds to the number of times that this apparatus detects the recording medium 111 and performs recording and playback as the "information necessary for specifying the recording medium" to be generated. If this apparatus performs the operation for the first time, the serial number is "1". If this apparatus performs the operation next time, the serial number is "2". Further, the control part 106 adds the date or time of the point of time when the recording medium 111 is detected, viewing information, the production number of the present recording and playback apparatus or the like to the above serial number, as the other "information necessary for specifying the recording medium", to finally generate only information necessary for specifying the detected recording medium 111. Such "information necessary for specifying the recording medium" is recorded as the medium information 120 into the recording medium 111, as an alternative to the "information specifying the recording medium" described in the second preferred embodiment. For this purpose, the control part 106 sends the above generated "information necessary for specifying the recording medium" to the recording and reading part 103 and gives the recording and reading part 103 an instruction to record the sent "information necessary for specifying the recording medium" into the recording medium 111 as the medium information 120. Receiving this instruction, the recording and reading part 103 records the received "information necessary for specifying the recording medium" into the area inside the detected recording medium 111, in which the medium information 120 is to be stored, as the medium information 120. In this case, the area to record the medium information 120 therein may be a predetermined area allocated inside the recording medium 111 in advance or part of data area instead of the predetermined allocated area. Alternatively, the "information necessary for specifying the recording medium" may be recorded in a data file format when the recording and reading part 103 records the "information necessary for specifying the recording medium" in the recording medium 111. At that time, by explicitly indicating the "information necessary for specifying the recording medium" by e.g., file name or the like, it is possible to prevent the "information necessary for specifying the recording medium" from being deleted by mistake when it is used by other apparatus. Alternatively, deleting of the information may be prevented by recording the information as information with overwrite protection. Then, when recording of the "information necessary for specifying the recording medium" into the recording medium 111 is completed, the recording and reading part 103 sends the notification to the control part 106, and the control part 106, receiving the notification, measures the recordable bit rate of the detected recording medium 111 containing the "information necessary for specifying the recording medium" in its medium information 120 by the method discussed in the first preferred embodiment and then writes the measured recordable bit rate associated with the above generated "information necessary for specifying the recording medium" into the look-up table (set of information) in the memory part 109.

On the other hand, as the result that the recording and reading part 103 searches the detected recording medium 111, if the recording and reading part 103 detects that the "information necessary for specifying the recording medium 111" is contained in the medium information 120, the recording and reading part 103 acquires the "information necessary for specifying the recording medium 111" from the medium information 120. The acquired "information necessary for specifying the recording medium 111" is not necessarily the one generated by the control part 106 of the present apparatus. Then, the recording and reading part 103 sends the acquired "information necessary for specifying the recording medium 111" to the control part 106, and the control part 106 uses the received "information necessary for specifying the recording medium 111" to search the look-up table (set of information) in the memory part 109 to see if the same information is recorded therein.

As the result of the search, if the control part 106 can not find the same information as the "information necessary for specifying the recording medium 111" in the look-up table of the memory part 109, the control part 106 measures the recordable bit rate of the recording medium 111 by the same method as discussed in the first preferred embodiment. Then, the control part 106 stores the recordable bit rate obtained by the measurement, together with the "information necessary for specifying the recording medium 111", into the look-up table (set of information) inside the memory part 109.

On the other hand, as the result of the search, if the control part 106 can find the same information as the "information necessary for specifying the recording medium 111" in the look-up table of the memory part 109, the control part 106 reads the recordable bit rate which is recorded, being associated with the "information necessary for specifying the recording medium 111", out from the above look-up table (set of information) of the memory part 109. Then, the control part 106 sets the recordable bit rate which is read out to the bit rate setting part 104 as the recordable bit rate of the recording medium 111. The operation of the bit rate setting part 104 will be discussed later in the fourth preferred embodiment. The operation in the present apparatus after setting the recordable bit rate is the same as that discussed in the first preferred embodiment, except the operation of the bit rate setting part 104.

In the recording and playback apparatus of the third preferred embodiment having the above constitution, even if there is no "information specifying the recording medium" in the recording medium, the "information necessary for specifying the recording medium" is generated and recorded in the recording medium and after that, it therefore becomes possible to specify the recording medium. As a result, it becomes possible to specify the recordable bit rate of the recording medium, and this eliminates the necessity of measuring the recordable bit rate again.

The Fourth Preferred Embodiment

Figure 4:
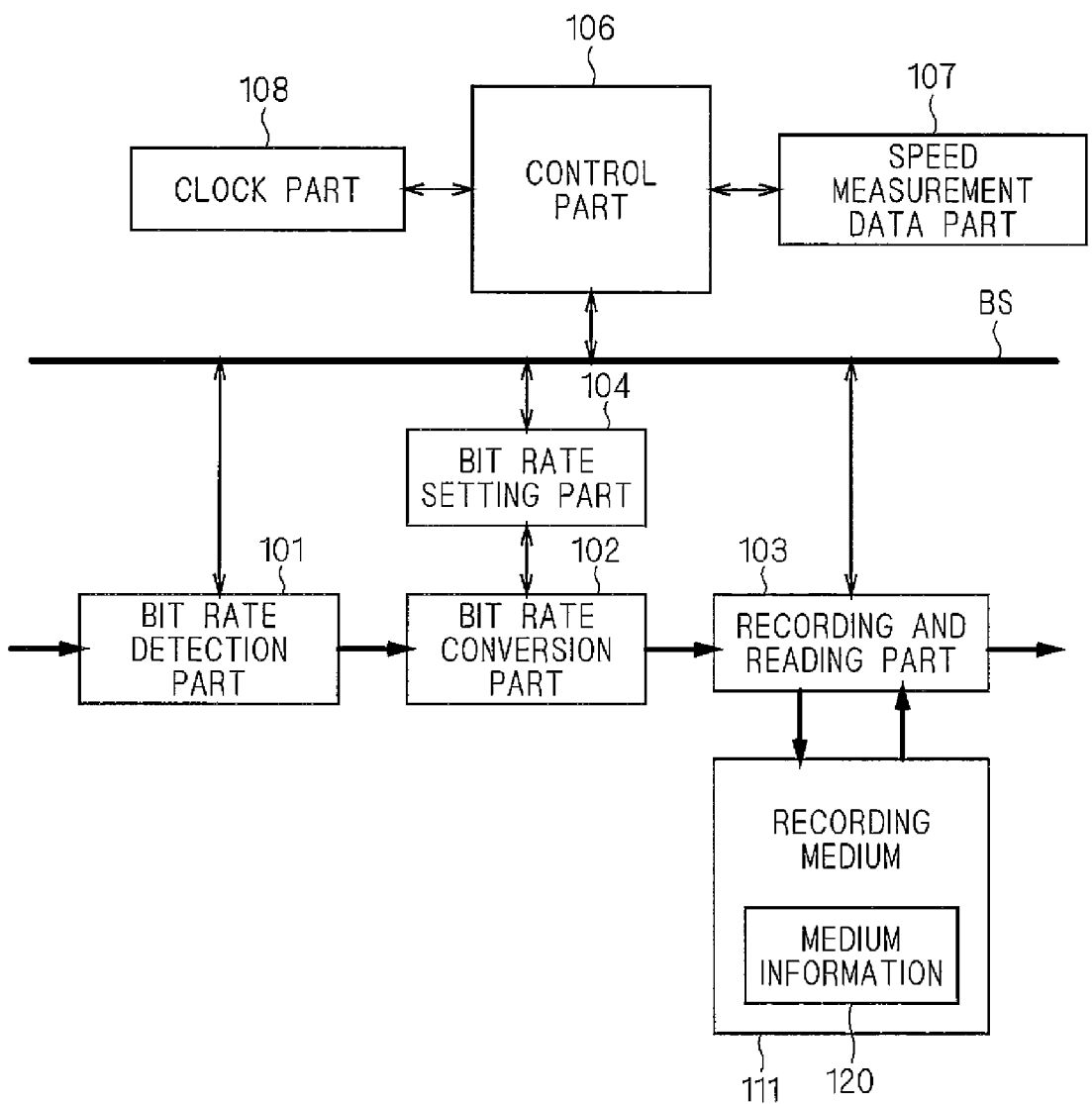
FIG. 4 is a block diagram showing a constitution of a recording and playback apparatus in accordance with a fourth preferred embodiment of the present invention.

FIG. 4 is a block diagram showing a constitution of a recording and playback apparatus in accordance with the fourth preferred embodiment of the present invention. In FIG. 4, the constituent elements identical to those in the third preferred embodiment are represented by the same reference signs.

FIG. 4 is different from FIG. 3 in that the memory part 109 of FIG. 3 is removed. In the fourth preferred embodiment, instead of the memory part 109, the recording medium 111 records the recordable bit rate of the recording medium 111 as the medium information 120. Hereinafter, description on the parts for performing the same operations as shown in the third preferred embodiment will be omitted.

In the fourth preferred embodiment, when the recording and reading part 103 detects the recording medium 111, the control part 106, in response to the detection result gives an instruction to the recording and reading part 103 so as to acquire the recordable bit rate of the detected recording medium 111 from its medium information 120.

Receiving the above instruction, the recording and reading part 103 searches the medium information 120 in the recording medium 111. As the result of the search, if there is no medium information 120 in the recording medium 111 or if the medium information 120 is found in the recording medium 111 but the recordable bit rate of the recording medium 111 is not found in the medium information 120, the recording and reading part 103 sends the search result to the control part 106, and the control part 106, receiving the search result, measures the recordable bit rate of the recording medium 111 by the same method as discussed in the first preferred embodiment. Then, the control part 106 gives the recording and reading part 103 an instruction to record the measured recordable bit rate into the recording medium 111 as the medium information 120. Receiving the instruction, the recording and reading part 103 records the measured recordable bit rate which is sent from the control part 106 into the recording medium 111 as the medium information 120. In this case, the predetermined area inside the recording medium 111 to record the medium information 120 therein may be a predetermined area allocated by the recording medium 111 in advance or part of data area instead of the predetermined allocated area. Alternatively, the measured recordable bit rate may be recorded in a data file format when the "information necessary for specifying the recording medium" is recorded in the recording medium 111. At that time, by explicitly indicating the "information necessary for specifying the recording medium" by e.g., file name or the like, it is possible to prevent the recordable bit rate from being deleted by mistake when it is used by other apparatus. Alternatively, deleting of the recordable bit rate may be prevented by recording the information as information with overwrite protection. Still alternatively, information other than the recordable bit rate, such as the date when the recordable bit rate is measured, the information on the recording medium 111 or the information on the type of data recorded in the recording medium 111 or the like, may be recorded together with the recordable bit rate into the recording medium 111 as the medium information 120.

On the other hand, as the result that the recording and reading part 103 searches the medium information 120 in the recording medium 111, if the recordable bit rate of the recording medium 111 is contained in the medium information 120, the recording and reading part 103 reads the recordable bit rate of the recording medium 111 out from the recording medium 111 and sends the recordable bit rate which is read out to the control part 106. Receiving the recordable bit rate sent from the recording and reading part 103, the control part 106 sets the recordable bit rate which is read out to the bit rate setting part 104 as the recordable bit rate of the recording medium 111. The operation of the bit rate setting part 104 will be discussed later. The operation in the present apparatus after setting the recordable bit rate is the same as that discussed in the first preferred embodiment, except the operation of the bit rate setting part 104.

In the recording and playback apparatus of the fourth preferred embodiment having the above constitution, since the recordable bit rate obtained by the measurement which is already made on the detected recording medium 111 by the control part 106 can be recorded into the recording medium 111 as the medium information 120, once the recordable bit rate is recorded into the recording medium 111, there is no necessity of measuring the recordable bit rate for each recording and playback apparatus after that, and it is therefore possible to set the recordable bit rate in other recording and playback apparatus by one measurement of the recordable bit rate (recording speed).

<Operation of Bit Rate Setting Part 104>

Hereinafter, the operation of the bit rate setting part 104 in each of the second to fourth preferred embodiments will be discussed.

If the control part 106 can not acquire the recordable bit rate from the memory part 109 or the recording medium 111, the bit rate setting part 104 of each of the second to fourth preferred embodiments performs a comparison between the recordable bit rate measured by the control part 106 by the same method as discussed in the first preferred embodiment and the input bit rate detected by the bit rate detection part 101. The operation of the bit rate setting part 104 for setting the bit rate to the bit rate conversion part 102 in this case is the same as that in the first preferred embodiment.

On the other hand, if the control part 106 can acquire the recordable bit rate from the memory part 109 or the recording medium 111, the control part 106 sets the recordable bit rate read out from the memory part 109 or the recording medium 111 to the bit rate setting part 104. Then, the bit rate setting part 104 performs a comparison between the recordable bit rate read out from the memory part 109 or the recording medium 111 and the input bit rate detected by the bit rate detection part 101 which is set by the control part 106.

As the result of the comparison between the recordable bit rate and the input bit rate, if the recordable bit rate read out from the memory part 109 or the recording medium 111 is larger than the input bit rate detected by the bit rate detection part 101, the bit rate setting part 104 sets the bit rate conversion part 102 not to change the bit rate. In accordance with the setting, without changing the bit rate of the inputted data, the bit rate conversion part 102 consequently outputs the data to the recording and reading part 103. Alternatively, the bit rate setting part 104 may set the bit rate conversion part 102 so that the bit rate after change of the input data will become smaller than the input bit rate.

On the other hand, if the recordable bit rate read out from the memory part 109 or the recording medium 111 is smaller than the input bit rate detected by the bit rate detection part 101, the bit rate setting part 104 sets the bit rate conversion part 102 so that the changed bit rate (recording bit rate) becomes the recordable bit rate read out from the memory part 109 or the recording medium 111.

Further, in order to leave a margin in the recording bit rate, the bit rate setting part 104 may use a bit rate obtained by multiplying the recordable bit rate read out from the memory part 109 or the recording medium 111 by a constant coefficient less than 1 as the bit rate to be compared with the input bit rate so that the bit rate to be set to the bit rate conversion part 102 may become slower than the recordable bit rate read out from the memory part 109 or the recording medium 111.

Alternatively, the bit rate setting part 104 may hold a plurality of setting bit rates settable to the bit rate conversion part 102, which are set in advance. Then, the bit rate setting part 104 may select one of the above setting bit rates, which is slower than the recordable bit rate read out from the memory part 109 or the recording medium 111 and use the selected setting bit rate as the bit rate to be compared with the input bit rate. Still alternatively, the bit rate setting part 104 may select some of the above setting bit rates, which are slower than the recordable bit rate read out from the memory part 109 or the recording medium 111 and use a bit rate obtained by a combination of the selected setting bit rates as the bit rate to be compared with the input bit rate.

Furthermore, in order to leave a margin in the recording bit rate, the bit rate setting part 104 may set a bit rate obtained by multiplying the smaller one out of the input bit rate detected by the bit rate detection part 101 and the recordable bit rate read out from the memory part 109 or the recording medium 111 which are compared with each other by a constant coefficient less than 1 to the bit rate conversion part 102.

Alternatively, the bit rate setting part 104 may hold a plurality of setting bit rates settable to the bit rate conversion part 102, which are set in advance. Then, the bit rate setting part 104 may select one of the above setting bit rates which is smaller than the smaller one out of the input bit rate and the recordable bit rate read out from the memory part 109 or the recording medium 111 which are compared with each other and set the selected setting bit rate to the bit rate conversion part 102.

Still alternatively, the bit rate setting part 104 may select one out of a plurality of setting bit rates set in the bit rate setting part 104 in advance, which is smaller than a bit rate obtained by multiplying the smaller one out of the input bit rate and the recordable bit rate read out from the memory part 109 or the recording medium 111 which are compared with each other by a constant coefficient less than 1, and set the selected setting bit rate to the bit rate conversion part 102.

In the recording and playback apparatus having the above constitution, it is possible for the bit rate setting part to use the recordable bit rate (recording speed) which is measured once and stored in the memory part or the recording medium as a comparison object to be compared with the input bit rate. Further, since it is possible to leave a margin in a set value for setting the recording bit rate, even if the input data whose input bit rate varies and is larger than the above set value is inputted, the data can be recorded.

The Fifth Preferred Embodiment

Figure 5:
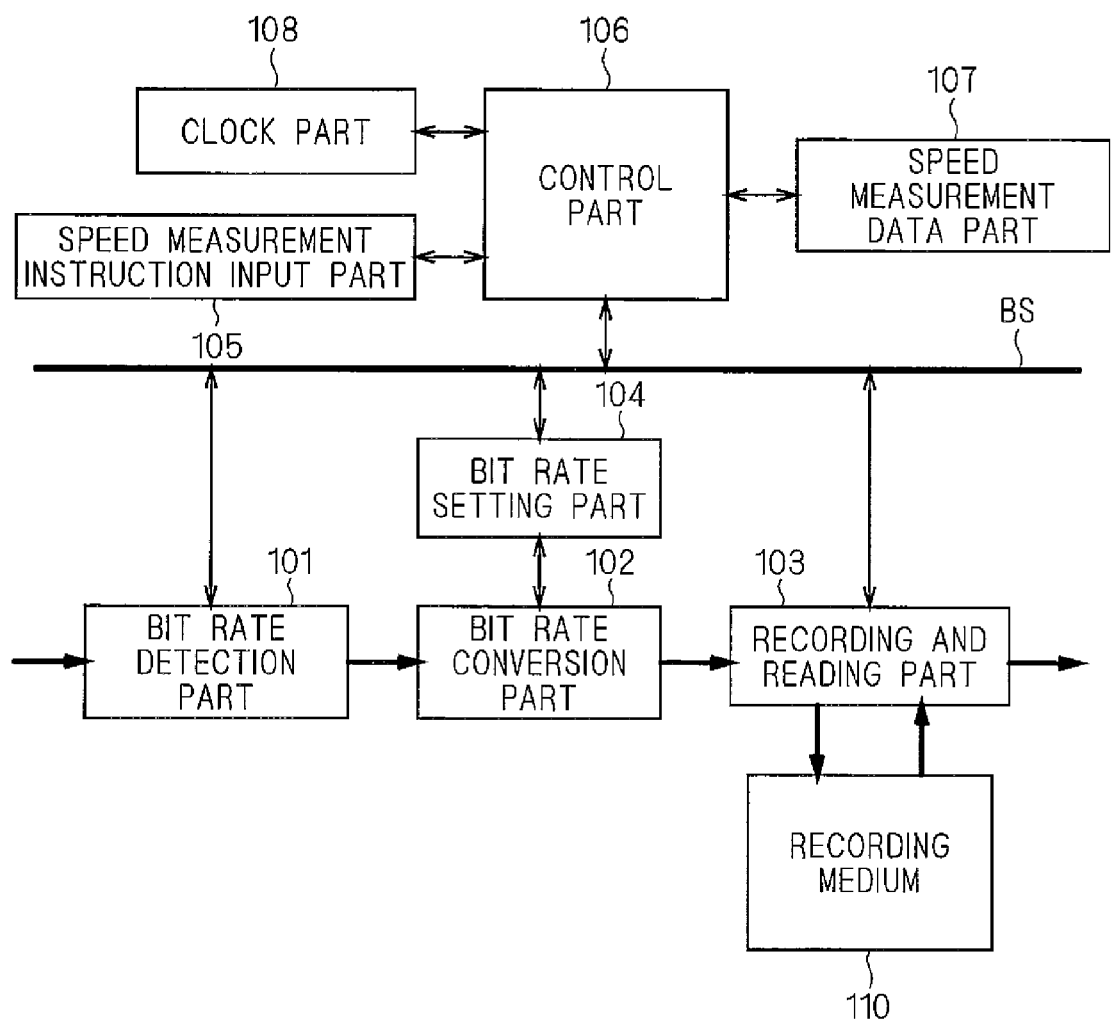
FIG. 5 is a block diagram showing a constitution of a recording and playback apparatus in accordance with a fifth preferred embodiment of the present invention.

FIG. 5 is a block diagram showing a constitution of a recording and playback apparatus in accordance with the fifth preferred embodiment of the present invention. In FIG. 5, the constituent elements identical to those in the first preferred embodiment (FIG. 1) are represented by the same reference signs.

In the fifth preferred embodiment, additional to the constitution of the first preferred embodiment (FIG. 1), a speed measurement instruction input part 105 is provided. Hereinafter, description on the parts for performing the same operations as shown in the first preferred embodiment will be omitted.

The recording and playback apparatus of FIG. 5 comprises the speed measurement instruction input part 105 in order for a user to give an instruction for measurement of the recording speed of the recording medium 110. Among users' instructions for speed measurement using the speed measurement instruction input part 105 are, e.g., an instruction by manipulating a remote controller, an instruction by manipulating buttons provided in this recording and playback apparatus, an instruction by voice using a microphone which is additionally provided in this recording and playback apparatus, an instruction through recognition of user's action by this recording and playback apparatus from video data taken by a camera which is additionally provided in this recording and playback apparatus, an instruction from other apparatus connected to a network to which this recording and playback apparatus is connected or the like.

Further, there may be a case where a display is provided in this recording and playback apparatus and a video output is performed to indicate the status for the user, on the display or by outputting graphics image.

In FIG. 5, when a user uses the speed measurement instruction input part 105 to give an instruction for measuring the speed of the recording medium 110, the control part 106 starts measurement of recording speed of the recording medium 110 in the same manner as discussed in the first preferred embodiment.

Though FIG. 5 shows the case where the speed measurement instruction input part 105 which is the characteristic feature of the fifth preferred embodiment is applied to the recording and playback apparatus of the first preferred embodiment shown in FIG. 1, the speed measurement instruction input part 105 which is the characteristic feature of the fifth preferred embodiment may be provided in the recording and playback apparatus of any one of the second to fourth preferred embodiments and the sixth preferred embodiment discussed later in the same manner, for improvement, in order to allow a user to give an instruction for measuring the speed of the recording medium. In this case, if the recordable bit rate is already stored in the memory part 109 or the recording medium 111, the control part 106 may replace the recordable bit rate stored in the memory part 109 or the recording medium 111 with a result of measurement which is newly performed by the control part 106 with user's instruction. Alternatively, instead of automatically replacing the recordable bit rate with the result of measurement performed by the control part 106 with user's instruction, if a display part such as an image device or the like is provided in this recording and playback apparatus, there may be a case where the control part 106 allows the user to judge whether to replace the recordable bit rate or not by displaying information on the video device or the like, indicating that the recordable bit rate is already stored in the memory part 109 or the recording medium 111, and only when the user gives the instruction, the control part 106 replace the recordable bit rate stored in the memory part 109 or the recording medium 111 with the result of measurement performed by the user's instruction.

In the recording and playback apparatus of the fifth preferred embodiment having the above constitution, it is possible for users to freely update the recording speed.

The Sixth Preferred Embodiment

In the recording and playback apparatus of each of the first to fifth preferred embodiments, the control part 106 may measure the reading speed of the recording medium 110 or 111 by using speed measurement data which is already recorded in the recording medium 110 or 111 or data which is already recorded in the recording medium 110 or 111 by the recording and reading part 103, in order for the control part 106 to measure the recording speed. Then, the bit rate setting part 104 may compare the reading speed set by the control part 106 with either the input bit rate or the recordable bit rate or both the input bit rate and the recordable bit rate, to determine the bit rate (recording bit rate) to be set to the bit rate conversion part 102. Hereinafter, discussion will be made on a case where this function is applied to the recording and playback apparatus of the second preferred embodiment.

In the recording and playback apparatus of the second preferred embodiment (FIG. 2), the control part 106 gives the recording and reading part 103 an instruction to read out either one of the data for speed measurement which is recorded in the recording medium 110 for measurement of the recording speed and the data which is already recorded in the recording medium 110. In this case, all of the data recorded in the recording medium 110 may be read out or part of the data may be. The control part 106 resets the clock part 108. Then, the control part 106 controls the recording and reading part 103 to read out data and operates the timer of the clock part 108 at the same time. When the control part 106 receives the signal from the recording and reading part 103 and thereby detects that the recording and reading part 103 finishes readout of the data, the control part 106 stops the timer of the clock part 108. At this point of time, the time that the timer of the clock part 108 indicates is a time required to read data out from the recording medium 110.

Then, by using the following equation (3), the control part 106 obtains a reading bit rate of the recording medium 110, which is a reading speed thereof, from the amount of read-out data and the reading time measured by the timer of the clock part 108. At that time, the control part 106 grasps the amount of read-out data.

$$\text{reading bit rate} = (\text{the amount of read-out data}) \div (\text{reading time}) \quad (3)$$

Next, discussion will be made on an operation of the bit rate setting part 104 for setting a bit rate to the bit rate conversion part 102.

The bit rate detection part 101 detects a bit rate of the inputted data. The information on the detected bit rate is sent to the control part 106, and the control part 106 transmits the received bit rate information to the bit rate setting part 104 as the input bit rate. The bit rate setting part 104 compares the input bit rate with the reading bit rate that the control part 106 calculates by using Eq. (3) and then sends thereto and the recordable bit rate that the control part 106 reads out from the look-up table in the memory part 109 or measures by using Eq. (1) and then sends thereto.

As the result of the comparison, if the input bit rate detected by the bit rate detection part 101 is smaller, the bit rate setting part 104 sets the bit rate conversion part 102 not to change the bit rate. In accordance with the setting, the bit rate conversion part 102 outputs the data to the recording and reading part 103, without changing the bit rate of the inputted data. Alternatively, the bit rate setting part 104 may set the bit rate conversion part 102 so that the bit rate after change of the input data will become smaller than the input bit rate. On the other hand, if the reading bit rate or the recordable bit rate is smaller than the input bit rate, the bit rate setting part 104 sets the bit rate conversion part 102 so that the changed recording bit rate may become the smaller one of the reading bit rate and the recordable bit rate.

In order to leave a margin in the recording bit rate, the bit rate setting part 104 may set a bit rate obtained by multiplying the smaller one of the input bit rate and the reading bit rate or/and the recordable bit rate which are compared with each other by a constant coefficient less than 1 to the bit rate conversion part 102.

Alternatively, a plurality of setting bit rates which are settable to the bit rate conversion part 102 are prepared in the bit rate setting part 104 in advance. Then, the bit rate setting part 104 may select one of the above setting bit rates which is smaller than the smaller one of the input bit rate and the reading bit rate or/and the recordable bit rate which are compared with each other and set the selected setting bit rate to the bit rate conversion part 102.

Still alternatively, the bit rate setting part 104 may select one of the plural setting bit rates set in the bit rate setting part 104 in advance, which is smaller than a bit rate obtained by multiplying the smaller one of the input bit rate and the reading bit rate or/and the recordable bit rate which are compared with each other by a constant coefficient less than 1, and set the selected setting bit rate to the bit rate conversion part 102.

(A) Further, in order to leave a margin in the recording bit rate, a bit rate having a value obtained by multiplying the measurement result (reading bit rate) obtained by the control part 106 from Eq. (3) by a coefficient less than 1 which is set in advance may be compared with the input bit rate, as a new reading bit rate which is slower than the measurement result. (B) Alternatively, the bit rate setting part 104 may hold in advance a plurality of setting bit rates which are settable to the bit rate conversion part 102, select one of the above setting bit rates, which is slower than the reading bit rate sent from the control part 106, and set the selected setting bit rate to the reading bit rate to be compared with the input bit rate, to perform the above comparison. (C) Still alternatively, by a combination of (A) and (B), the bit rate setting part 104 may set the reading bit rate to be compared with the input bit rate, to perform the above comparison.

In the recording and playback apparatus of the sixth preferred embodiment having the above constitution, even if recording of the input data and readout of the recorded data are performed at the same time and the reading speed is slower than the recording speed, it is possible to record and read out the data.

While the invention has been shown and described in detail, the foregoing description is in all aspects illustrative and not restrictive. It is therefore understood that numerous modifications and variations can be devised without departing from the scope of the invention.

For instance, the present invention is preferably applied to image apparatus such as TVs and DVD recorders.

What is claimed is:

1. A recording and playback apparatus comprising:
    a recording and reading part configured to detect a recording medium and to record and read out data into/from said recording medium;
    a bit rate detection part configured to detect a bit rate of data inputted from the outside;
    a bit rate setting part;
    a bit rate conversion part configured to convert said bit rate of said inputted data into a bit rate set by said bit rate setting part and to output input data after bit rate conversion to said recording and reading part; and
    a control part configured to transmit said bit rate of said input data sent from said bit rate detection part to said bit rate setting part as an input bit rate and send data for recording speed measurement to said recording and reading part in response to detection of said recording medium by said recording and reading part to thereby control said recording and reading part to start recording said data for recording speed measurement into said recording medium, said control part measuring a recordable bit rate that is a speed for recording into said recording medium on the basis of the amount of said data for recording speed measurement which is sent to said recording and reading part and a recording time required to record said data for recording speed measurement into said recording medium and outputting said recordable bit rate to said bit rate setting part when said control part detects, by an end signal from said recording and reading part, that recording of said data for recording speed measurement into said recording medium is completed,
    wherein said bit rate setting part performs a comparison between said input bit rate and a comparison object including at least said recordable bit rate, and (a) if said comparison object which is compared with said input bit rate is larger than said input bit rate, said bit rate setting part sets said bit rate conversion part so that a bit rate after conversion of said input data becomes not larger than said input bit rate, and (b) if said comparison object is smaller than said input bit rate, said bit rate setting part sets said bit rate conversion part so that the bit rate after conversion of said input data becomes not larger than the smallest one out of said comparison object.

2. The recording and playback apparatus according to claim 1, further comprising
    a memory part including a look-up table which consists of specific information that is only information specifying said recording medium and said recordable bit rate of said recording medium corresponding to the specific information,
    wherein said control part outputs an instruction to said recording and reading part so as to acquire said specific information on said detected recording medium from the recording medium in response to detection of said recording medium by said recording and reading part,
    said recording and reading part acquires said specific information on said detected recording medium in response to said instruction for acquisition,
    after that, when said recording and reading part sends said acquired specific information to said control part, said control part accesses said memory part and makes a search to see whether or not the same information as said specific information on said detected recording medium is found in said look-up table of said memory part,
    (c) as the result of the search, if said control part can not find the same information as said specific information in said look-up table of said memory part, said control part measures said recordable bit rate on said detected recording medium, records said recordable bit rate obtained by measurement, together with said specific information acquired by said recording and reading part, into said look-up table of said memory part and outputs said recordable bit rate obtained by measurement to said bit rate setting part, and
    (d) as the result of the search, if said control part can find the same information as said specific information in said look-up table of said memory part, said control part reads said recordable bit rate which is stored together with said specific information out from said look-up table of said memory part, without measuring said recordable bit rate on said detected recording medium, and outputs said recordable bit rate which is read out to said bit rate setting part as the recordable bit rate on said detected recording medium.

3. The recording and playback apparatus according to claim 1, further comprising
    a memory part including a look-up table which consists of medium information that is only information necessary for specifying said recording medium and said recordable bit rate of said recording medium corresponding to the medium information,
    wherein said control part outputs an instruction to said recording and reading part so as to acquire said medium information on said detected recording medium from the recording medium in response to detection of said recording medium by said recording and reading part,
    (c) as the result that said recording and reading part searches said detected recording medium in response to said instruction from said control part, if said recording and reading part sends said control part a notification that no medium information on the recording medium is recorded in the recording medium, said control part generates the medium information on said detected recording medium for itself and instructs said recording and reading part so as to record the generated medium information into said detected recording medium, and as a result, after said recording and reading part records said generated medium information which is sent from said control part into said detected recording medium, said control part measures said recordable bit rate on said detected recording medium, records said recordable bit rate obtained by the measurement, together with said generated medium information, into said look-up table of said memory part and outputs said recordable bit rate obtained by said measurement to said bit rate setting part, and (d) as the result that said recording and reading part searches said detected recording medium in response to said instruction from said control part, if said recording and reading part detects that the medium information on the recording medium is recorded in the recording medium and sends said medium information acquired from the recording medium to said control part, said control part accesses said memory part and makes a search to see whether or not the same information as said medium information on said detected recording medium is found in said look-up table of said memory part, (d-1) as the result of the search, if said control part can not find the same information as said medium information in said look-up table of said memory part, said control part measures said recordable bit rate on said detected recording medium, records said recordable bit rate obtained by the measurement, together with said medium information acquired by said recording and reading part, into said look-up table of said memory part and outputs said recordable bit rate obtained by said measurement to said bit rate setting part, and (d-2) as the result of the search, if said control part can find the same information as said medium information in said look-up table of said memory part, said control part reads said recordable bit rate which is stored together with said medium information out from said look-up table of said memory part, without measuring said recordable bit rate on said detected recording medium, and outputs said recordable bit rate which is read out to said bit rate setting part as the recordable bit rate on said detected recording medium.

4. The recording and playback apparatus according to claim 1, wherein said control part outputs an instruction to said recording and reading part so as to acquire the recordable bit rate on said detected recording medium from the recording medium in response to detection of said recording medium by said recording and reading part, (c) as the result that said recording and reading part searches said detected recording medium in response to said instruction from said control part, if said recording and reading part sends said control part a notification that no recordable bit rate on the recording medium is recorded in the recording medium, said control part measures said recordable bit rate on said detected recording medium, instructs said recording and reading part to record said recordable bit rate obtained by the measurement into said detected recording medium as medium information and outputs said recordable bit rate obtained by said measurement to said bit rate setting part, and (d) as the result that said recording and reading part searches said detected recording medium in response to said instruction from said control part, if said recording and reading part detects that the recordable bit rate on the recording medium is recorded in the recording medium and sends said recordable bit rate read out from the recording medium to said control part, said control part outputs said recordable bit rate received from said recording and reading part to said bit rate setting part as the recordable bit rate on said detected recording medium.

5. The recording and playback apparatus according to claim 1, wherein said control part instructs said recording and reading part so as to read a predetermined amount of data out from said recording medium after measurement of said recordable bit rate of said detected recording medium, and after that, when said control part detects that said recording and reading part finishes reading of said data, said control part measures a reading bit rate that is a speed for reading data from said recording medium on the basis of said predetermined amount of read-out data and a reading time required for said recording and reading part to read out said predetermined amount of data and outputs said reading bit rate together with said recordable bit rate to said bit rate setting part, and said bit rate setting part compares said input bit rate with said recordable bit rate and said reading bit rate, and (a) if said input bit rate is smaller than said recordable bit rate and than said reading bit rate, said bit rate setting part sets said bit rate conversion part so that the bit rate after change of said input data becomes not larger than said input bit rate, or (b) if said input bit rate is larger than said recordable bit rate or than said reading bit rate, said bit rate setting part sets said bit rate conversion part so that the bit rate after change of said input data becomes not larger than the smaller one of said recordable bit rate and said reading bit rate.

6. The recording and playback apparatus according to claim 1, further comprising a speed measurement instruction input part capable of issuing an instruction to said control part so as to start measurement of a recording speed of said detected recording medium.

7. The recording and playback apparatus according to claim 1, wherein said bit rate setting part sets a bit rate obtained by multiplying a value of the smallest one among comparison results between said input bit rate and all other elements included in said comparison object, respectively, by a constant coefficient less than 1 to said bit rate conversion part.

8. The recording and playback apparatus according to claim 1, wherein said bit rate setting part holds a plurality of setting bit rates which are settable to said bit rate conversion part in advance, and said bit rate setting part selects a bit rate having a value smaller than a value of the smallest one among comparison results between said input bit rate and all other elements included in said comparison object, respectively, out of said plurality of setting bit rates and sets the selected setting bit rate to said bit rate conversion part.

9. The recording and playback apparatus according to claim 1, wherein said bit rate setting part holds a plurality of setting bit rates which are settable to said bit rate conversion part in advance, and said bit rate setting part selects a bit rate having a value smaller than a value of a bit rate obtained by multiplying a value of the smallest one among comparison results between said input bit rate and all other elements included in said comparison object, respectively, by a constant coefficient less than 1 out of said plurality of setting bit rates and sets the selected setting bit rate to said bit rate conversion part.

10. The recording and playback apparatus according to claim 1, wherein said bit rate setting part sets a bit rate obtained by multiplying a value to be compared with said input bit rate, which is sent from said control part, by a constant coefficient less than 1 as the comparison object to be compared with said input bit rate, to perform said comparison.

11. The recording and playback apparatus according to claim 1, wherein said bit rate setting part holds a plurality of setting bit rates which are settable to said bit rate conversion part in advance, and said bit rate setting part selects a bit rate slower than a value to be compared with said input bit rate, which is sent from said control part, out of said plurality of setting bit rates and sets the selected setting bit rate as the comparison object to be compared with said input bit rate, to perform said comparison.

12. The recording and playback apparatus according to claim 1, wherein said bit rate setting part holds a plurality of setting bit rates which are settable to said bit rate conversion part in advance, and said bit rate setting part selects a bit rate slower than a bit rate obtained by multiplying a value to be compared with said input bit rate, which is sent from said control part, by a constant coefficient less than 1 out of said plurality of setting bit rates and sets the selected setting bit rate as the comparison object to be compared with said input bit rate, to perform said comparison.

* * * * *